United States Patent [19]
Jeong

[11] Patent Number: 6,108,742
[45] Date of Patent: *Aug. 22, 2000

[54] METHOD AND APPARATUS OF INTERFACING DATA BETWEEN MICROPROCESSOR AND MEMORY

[75] Inventor: Jong-Sik Jeong, Seoul, Rep. of Korea

[73] Assignee: Samsung Electronics Co., Ltd., Suwon, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/858,345

[22] Filed: May 19, 1997

[30] Foreign Application Priority Data

May 21, 1996 [KR] Rep. of Korea ................ 96-17276

[51] Int. Cl.[7] .................................................. G06F 13/38
[52] U.S. Cl. ........................... 710/130; 710/129; 710/53; 711/117; 711/167; 369/32; 713/500; 713/502
[58] Field of Search ..................... 711/117, 167; 713/500; 9/502; 369/32; 710/129, 130

[56] References Cited

U.S. PATENT DOCUMENTS

| | | | |
|---|---|---|---|
| 5,163,132 | 11/1992 | Dulac et al. | 395/873 |
| 5,195,182 | 3/1993 | Sasson | 710/53 |
| 5,224,213 | 6/1993 | Dieffenderfer et al. | 395/873 |
| 5,502,822 | 3/1996 | Takebe | 395/310 |
| 5,584,033 | 12/1996 | Barrett et al. | 710/105 |
| 5,623,700 | 4/1997 | Parks et al. | 710/53 |
| 5,671,445 | 9/1997 | Glugas et al. | 395/873 |
| 5,805,173 | 9/1998 | Glennon et al. | 345/501 |
| 5,808,629 | 9/1998 | Nally et al. | 345/508 |
| 5,812,976 | 9/1998 | Ryan | 704/201 |

*Primary Examiner*—Hiep T. Nguyen
*Attorney, Agent, or Firm*—Staas & Halsey LLP

[57] ABSTRACT

A method and apparatus of interfacing data between a microprocessor and a memory, in which the microprocessor accesses data temporarily stored in the memory. The microprocessor controls a read timing according to an interrupt signal so as to generate a transmission request signal, the data being read according to the transmission request signal, and the interrupt signal being generated when a predetermined amount of data is stored in the memory.

22 Claims, 2 Drawing Sheets

METHOD AND APPARATUS OF INTERFACING DATA BETWEEN MICROPROCESSOR AND MEMORY

BACKGROUND OF THE INVENTION

1. Field of the Invention

The present invention relates to data transmission and, more particularly, to a method and apparatus of alternate interfacing for read/write of data of one data sector according to a microprocessor and two memories.

2. Description of the Related Art

A digital video disk, a digital moving picture disk medium, is a next-generation high-quality multimedia memory device storing a digital picture of moving picture experts group 2 (MPEG2) over two hours. In order to demodulate the data to an original signal in a decoder for reproducing the data stored in the digital video disk, the data is read and temporarily stored in a memory. Here, a microprocessor for controlling the decoder reads data required for access of the memory. When the microprocessor reads all data stored in the memory, its read timing should be adjusted according to various circumstances. Furthermore, the memory must alternately read and write data without loss.

SUMMARY OF THE INVENTION

An object of the present invention is to provide a method and apparatus of interfacing data between a microprocessor and a memory, in which a write-mode memory is converted to a read-mode memory when a predetermined amount of data is written in the write-mode memory, and two memories alternately perform write and read modes, to thereby output data to the microprocessor.

Another object of the present invention is to provide a method of interfacing data between a microprocessor and a memory, in which the microprocessor controls the read timing by an interrupt when a predetermined amount of data is written in the memory.

To accomplish the objects of the present invention, there is provided a method of interfacing data between a microprocessor and memory, in which the microprocessor accesses data temporarily stored in the memory, the microprocessor controlling a read timing according to an interrupt signal so as to generate a transmission request signal, the data being read according to the transmission request signal, the interrupt signal being generated when a predetermined amount of data is stored in the memory.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE PREFERRED EMBODIMENT

Reference will now be made in detail to the preferred embodiment of the present invention, examples of which are illustrated in the accompanying drawings. For clarity, component reference numbers are consistent between all the drawings.

Figure 1:
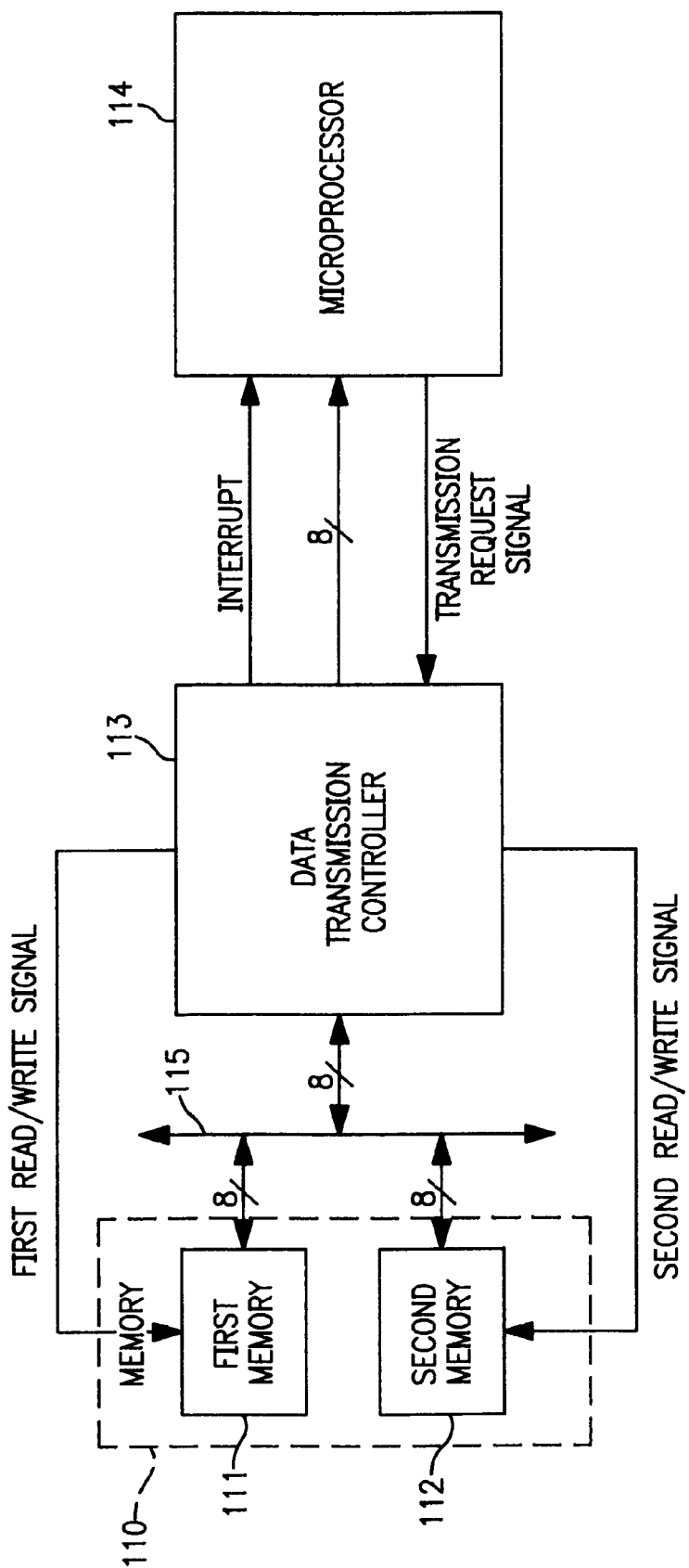
FIG. 1 is a system block diagram of a microprocessor and a memory according to a preferred embodiment of the present invention.

FIG. 1 is a system block diagram of a microprocessor and a memory according to the preferred embodiment of the present invention. Referring to FIG. 1, a data bus 115 is connected to several devices for reproducing data such as a demodulator, an error correction portion and a descrambler. A data transmission controller 113 connected to the data bus 115 selects an address for the purpose of accessing data in the data bus 115 to a memory 110, and generates various control signals so as to substantially read/write data from/to the memory 110. By doing so, the memory 110 temporarily stores the data of the data bus 115 for processing data reproduced from a digital video disk under the control of the data transmission controller 113. Here, the memory 110 includes write-mode and read-mode memories which are set to a current memory selection circumstance. That is, when a first memory 111 is in the write mode, a second memory 112 is in the read mode. A microprocessor 114 accesses data to be read from the first and second memories 111 and 112 through the data transmission controller 113.

The data transmission controller 113 checks the amount of data when the data of the data bus 115 is stored in the write-mode memory. Here, if the amount of data becomes 2048 bytes of one data sector, the data transmission controller 113 outputs an interrupt signal to the microprocessor 114. The microprocessor 114 recognizes if it can read the data according to the interrupt signal, and outputs an activated transmission request signal to the data transmission controller 113. The data transmission controller 113 outputs write and read signals to the first and second memories 111 and 112, respectively, in order to convert the write-mode memory to the read-mode memory, or the read-mode memory to the write-mode memory according to the transmission request signal. Then, the write-mode memory is converted to the read-mode memory according to the read signal so as to output data of one data sector to the data transmission controller 113, and the read-mode memory is converted to the write-mode memory by the write signal so as to store the data of the data bus 115.

Figure 2:
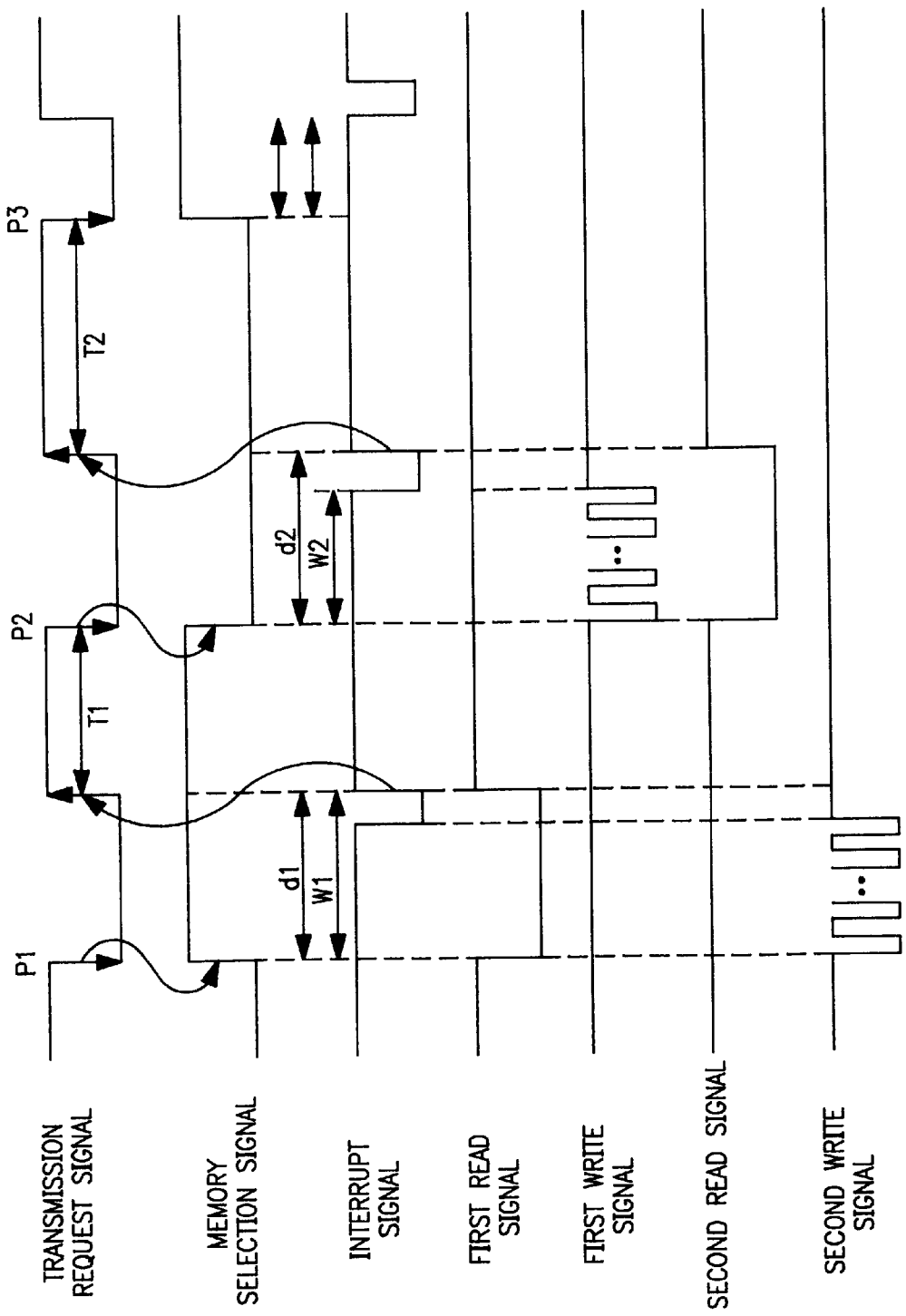
FIG. 2 is a timing diagram for data interface between a microprocessor and memory according to the preferred embodiment of the present invention.

FIG. 2 is a timing diagram for data interface between a microprocessor and a memory according to the preferred embodiment of the present invention. Referring to FIGS. 1 and 2, the transmission request signal is output from the microprocessor 114 to the data transmission controller 113 at point P1. Then, a memory selection signal becomes a "high" level according to the data transmission controller 113, and the data transmission controller 113 outputs a first read signal and a second write signal to the first memory 111 and the second memory 112, respectively. By doing so, the data transmission controller 113 accesses one data sector of data stored in the first memory 111 and outputs it to the microprocessor 114 during period dl. Here, the address of the data transmitted to the microprocessor 114 is output from the microprocessor 114.

Furthermore, the data transmission controller 113 writes the data of the data bus 115 in the second memory 112 during the period W1. Here, the address of a region where the data is stored is output from the data transmission controller 113. The period of the signal for writing the data of data bus 115 in the second memory 112 is shorter than that of the read signal of the microprocessor 114. Thus, the writing operation is completed before the microprocessor 114 reads all of the data from the first memory 111.

The data transmission controller 113 confirms if the amount of data written in the second memory 112 corresponds to one data sector, and generates the interrupt signal to the microprocessor 114 when it does. The interrupt signal becomes an inactivated "high" level according to the rising edge where the transmission request signal is inactivated. The read signal and address are not generated during the period T1 before the transmission request signal from the microprocessor 114 is activated. This is to protect the stored data and transmit the data by 2049 bytes. During the period T1, the microprocessor 114 performs the operation required.

The transmission request signal becomes an activated "low" level by the microprocessor 114 at point P2. Then, the "high" level of a memory selection signal becomes a "low" level. By doing so, the data transmission controller 113 outputs a first write signal in order to convert the read mode of the first memory 111 to the write mode, and outputs a second read signal in order to convert the write mode of the second memory 112 to the read mode. During the period d2, the second memory 112 in the read mode outputs one data sector of data which was stored during the period d1 to the microprocessor 114 through the data transmission controller 113 under the control of the data transmission controller 113. The first memory 111 in the write mode stores the data of the data bus 115 under the control of data transmission controller 113 during the period W2.

When the amount of data stored in the first memory 111 corresponds to one data sector, data transmission controller 113 generates a "low" level of the interrupt signal, and the transmission request signal of the microprocessor 114 becomes an inactivated "high" level state. The microprocessor 114 controls the read timing of data during period T2, and outputs a "low" level of the transmission request signal at point P3.

An address generating portion which is applied to the first memory 111 and the second memory 112 is varied according to a state of the memory selection signal between the microprocessor 114 and the data transmission controller 113.

First, in the case that the memory selection signal is a "high" level, the data transmission controller 113 applies an address generated from the microprocessor 114 to the first memory 111. At this time, the address to the second memory 112 is generated from the data transmission controller 113 and is applied to the second memory 112. That is, a read address generated from the microprocessor 114 is applied to the first memory 111 through the data transmission controller 113, and the write address generated from the data transmission controller 113 is applied to the second memory 112. Accordingly, in this case, the microprocessor 114 corresponds to a first memory address generating portion, and the data transmission controller 113 corresponds to a second memory address generating portion.

Secondly, in the case that the memory selection signal is a "low" level, the data transmission controller 113 applies the address generated from the microprocessor 114 to the second memory 112. At this time, the address to the first memory 111 is generated from the data transmission controller 113 and is applied to the second memory 112. That is, the read address generated from the microprocessor 114 is applied to the second memory 112 through the data transmission controller 113, and the write address generated from the data transmission controller 113 is applied to the first memory 111. Accordingly, in this case, the data transmission controller 113 corresponds to the first memory address generating portion, and the microprocessor corresponds to the second memory address generating portion.

The relation of the memory selection signal, memory address generator and operation mode will be shown in the following table.

| address generating portion and operation mode | "high" level of memory selection signal | "low" level of memory selection signal |
|---|---|---|
| first memory address generating portion | microprocessor | data transmission controller |
| first memory operation mode | read | write |
| second memory address generating portion | data transmission controller | microprocessor |
| second memory operation mode | write | read |

When the transmission request signal of an inactivated "high" level is generated, the microprocessor 114 carries out the operation required. On the other hand, the microprocessor 114 performs only the data reading operation when the transmission request signal becomes a "low" level. As described above, when the amount of data stored in the write-mode memory corresponds to one data sector, the interrupt is applied to the microprocessor 114, and the microprocessor 114 controls the read timing according to the interrupt. By doing so, the data amount of one data sector can be read. Moreover, since the first and second memories 111 and 112 are alternately operated in the write mode and the read mode, the data can be stored without loss, resulting in a decrease of error. In the aforementioned embodiment of the present invention, a digital video disk is illustrated. However, the present invention can be applied to the interface for reading data of a microprocessor and a memory of another type of device.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of interfacing data between a microprocessor and a memory in a DVD system, wherein the microprocessor accesses the data temporarily stored in the memory, comprising the steps of:

generating a transmission request signal to initiate a read of data from the memory;

reading the data from the memory to the microprocessor while the transmission request signal is being generated;

writing additional data to the memory while the transmission request signal is being generated;

generating an interrupt signal when a predetermined amount of additional data is stored in the memory so as to stop the reading of the data;

pausing reading and writing to allow the data read to be operated on; and repeating the foregoing steps, with the additional data being the data.

2. The method as claimed in claim 1, wherein the predetermined amount of the data is 2048 bytes of one data sector.

3. A method of interfacing data between a microprocessor and a memory in a DVD system, the memory having first and second memories, wherein the microprocessor accesses the data temporarily stored in the first and second memories; comprising the steps of:

setting one of the first and second memories to one of a read mode and a write mode and setting the second memory to the other of a read mode and a write mode;

generating a transmission request signal, from the microprocessor, for reading data from whichever of the first and second memories is set to a read mode and writing data to whichever of the first and second memories is set to a write mode;

generating an interrupt signal each time an amount of the data written into one of the first and second memories reaches a predetermined amount, the interrupt signal causing the microprocessor to cease generating the transmission request signal and to subsequently process the data read from the first or second memory; and converting one of the first and second memories from the write mode to the read mode and the other one of the first and second memories from the read mode to the write mode.

4. A method of interfacing data between a microprocessor and memory in a DVD system including the microprocessor, the memory having first and second memories for temporarily storing the data to be transmitted, and a data transmission controller for receiving the data, outputting the data to one of the first and second memories in a write-mode, accessing the data, and outputting the data from one of the first and second memories in a read-mode, the first and second memories being alternately operated in write and read modes, and the data transmission controller being placed between the first and second memories, the method comprising the steps of:

outputting the data to the one of the first and second memories in the write-mode, and generating an interrupt signal to the microprocessor when the data stored in the one memory in the write-mode becomes a predetermined amount;

controlling a data read timing according to the interrupt signal, to thereby generate an activated transmission request signal, the controlling step being performed by the microprocessor;

outputting the data stored in the other one of the first and second memories in the read-mode to the microprocessor when the transmission request signal becomes activated and pausing data transfer while the microprocessor operates on the read data; and converting the one memory from the write-mode to the read mode and the other one memory from the read mode to the write-mode in response to the interrupt signal;

wherein the converting and outputting steps are performed by the data transmission controller.

5. The method as claimed in claim 4, further comprising the step of setting the write and read modes of the first and second memories respectively according to first and second write signals, and first and second read signals, wherein the write signals and the read signals are output from the data transmission controller.

6. The method as claimed in claim 5, wherein the first memory receives the first write signal and the first read signal, and the second memory receives the second write signal and the second read signal.

7. The method as claimed in claim 4, wherein the one memory in the write mode stores the data according to an address output from the microprocessor, and the other one memory in the read mode-mode is accessed according to an address output from the data transmission controller.

8. The method as claimed in claim 4, wherein the predetermined amount of the data is 2048 bytes of one data sector.

9. A method of interfacing data between a microprocessor and a memory in a DVD system, comprising the steps of:

reading first data from the memory to the microprocessor and writing second data to the memory based upon a transmission request signal from the microprocessor until an interrupt signal is generated;

generating the interrupt signal in response to a predetermined amount of the second data being written into the memory; and pausing reading and writing while the microprocessor operates on the read first data.

10. The method as claimed in claim 9, wherein the memory includes first and second memories and wherein:

said reading and writing step comprises the steps of:

operating the first memory in a reading mode to read the first data and the second memory in a writing mode to write the second data in response to the transmission request signal, and reversing the reading and writing modes of the first and second memories in response to the interrupt signal; and said interrupt generating step comprises the step of generating the interrupt signal each time one of the first and second memories receives the predetermined amount of corresponding data.

11. The method as claimed in claim 10, wherein the reading mode of each of the first and second memories is longer than the writing mode of the other one of the first and second memories.

12. The method as claimed in claim 10, wherein said reading and writing step further comprises the step of simultaneously reading from one of the first and second memories and writing from the other one of the first and second memories.

13. The method as claimed in claim 12, wherein the reading mode of the one memory is longer than the writing mode of the other one memory.

14. A DVD apparatus comprising:

a microprocessor to process DVD data and generating a transmission request signal;

a memory having
a first memory section to store a first portion of the DVD data, and
a second memory section to store a second portion of the DVD data; and a data transmission controller, connected between said microprocessor and said memory, to alternately operate said first and second memory sections in read and write modes in response to said transmission request signal, and to generate an interrupt signal in response to determining when one of said first and second memory sections writes a predetermined amount of the corresponding first and second portions during the corresponding write mode;

wherein said microprocessor changes said transmission request signal in response to receiving said interrupt signal from said data transmission controller, to cause said data transmission controller to switch the read and write modes of said first and second memory sections, said microprocessor reissuing the transmission request signal after processing the received data.

15. The apparatus as claimed in claim in 14, wherein said data transmission controller simultaneously writes to the one of said first and second memory sections which in the write mode and reads from the other one of said first and second memory sections which is in the read mode.

16. The apparatus as claimed in claim 15, wherein said reading from the other one of said first and second memory sections is longer than said writing to the one of said first and second memory sections.

17. The apparatus as claimed in claim 16, wherein said reading from the other one of said first and second memory sections is longer than said writing to the one of said first and second memory sections by an amount of time approximately equal to a duration of a pulse of said interrupt signal.

18. The apparatus as claimed in claim 14, wherein said data controller generates a read signal in response to said transmission request signal to read the corresponding first or second portion from the other one of said first and second memory sections which is in the read mode and generates a write signal in response to said transmission request signal to write the corresponding first or second portion from the one of said first and second memory sections which is in the write mode, said microprocessor changing a state of said transmission request signal for a length of time in response to said interrupt signal, wherein said data transmission controller does not read to or write from either of said first and second memory sections and said microprocessor processes the data received from either said first or second memory sections during the length of time.

19. The apparatus as claimed in claim 16, wherein said data transmission controller reads from the other one of said first and second memory sections for a time period which is longer than said data transmission controller writes to the one of said first and second memory sections by an amount of time approximately equal to a duration of a pulse of said interrupt signal.

20. The apparatus as claimed in claim 19, wherein microprocessor changes state at an end of the pulse of said interrupt signal.

21. A DVD apparatus comprising:
a data bus;
a microprocessor to process DVD data and generating a transmission request signal;
a memory, connected to the data bus to store DVD data received from said data bus and output DVD data to said data bus, said memory having a first memory section, and
a second memory section;
a data transmission controller, connected between the data bus and the microprocessor so as to transfer DVD data from the data bus to the microprocessor, to operate one of the first and second memory sections in a write mode while operating the other one of the first and second memory sections in a read mode, in response to said transmission request signal, and to generate an interrupt signal in response to determining when one of said first and second memory sections writes a predetermined amount of DVD data;
wherein said microprocessor changes said transmission request signal in response to receiving said interrupt signal from said data transmission controller, to cause said data transmission controller to switch the read and write modes of said first and second memory sections.

22. A DVD device comprising:
a data bus;
a memory having first and second areas, connected to said data bus, to store DVD data received from said data bus and output DVD data to said data bus;
a microprocessor to request the data stored in said memory; and
a data transmission controller, connected between said data bus and said microprocessor so as to transfer DVD data from said data bus to said microprocessor, that alternatively writes the DVD data in one of the first area or the second area of said memory while reading the DVD data from the other of the first area or the second area of said memory, determines when a predetermined amount of said data is written in said memory, and changes read/write modes of the first and second areas in response to said determination that said predetermined amount of said data is written in said memory.

* * * * *